Dec. 22, 1959   O. W. HOSKING   2,918,250
VALVE WITH FLUID-OPERATED CONTROL
Filed July 17, 1953   2 Sheets-Sheet 2
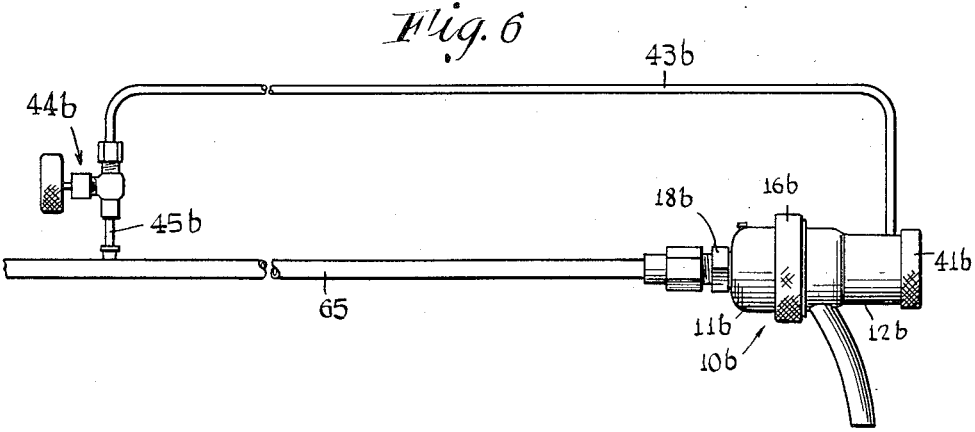
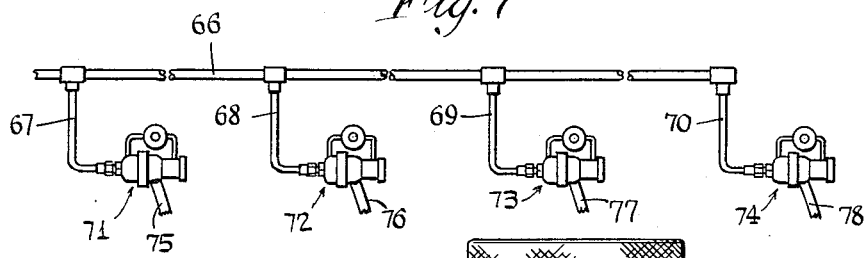
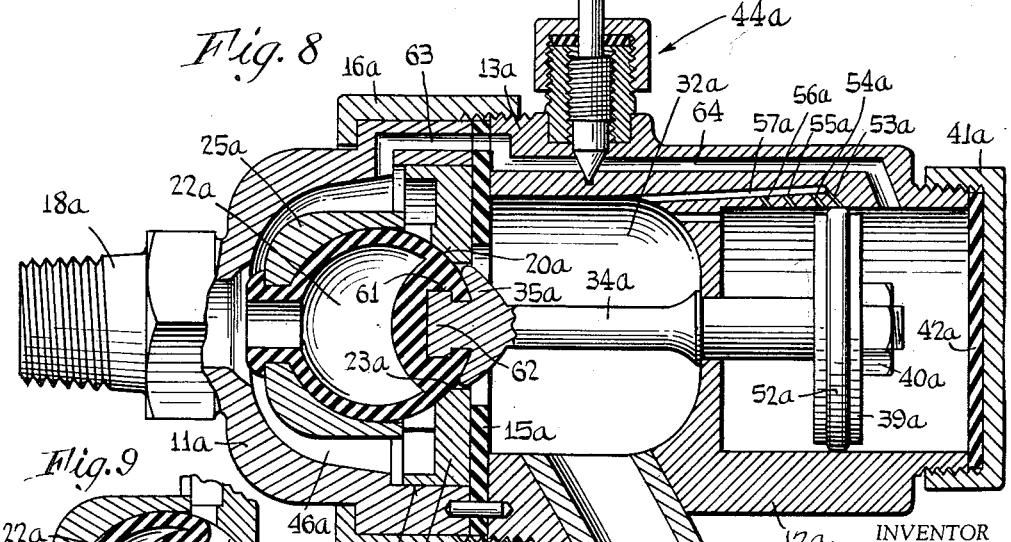
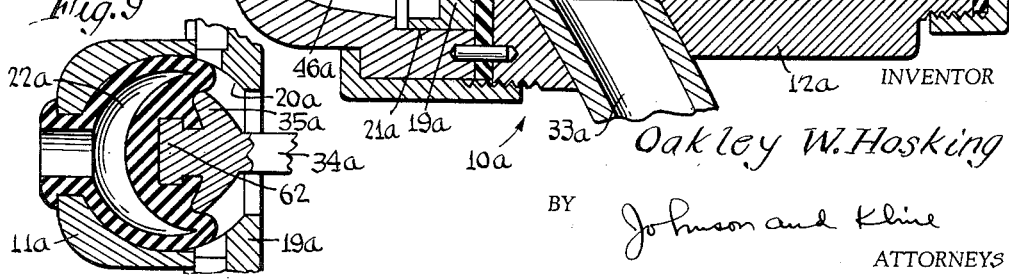
INVENTOR
Oakley W. Hosking
BY Johnson and Kline
ATTORNEYS

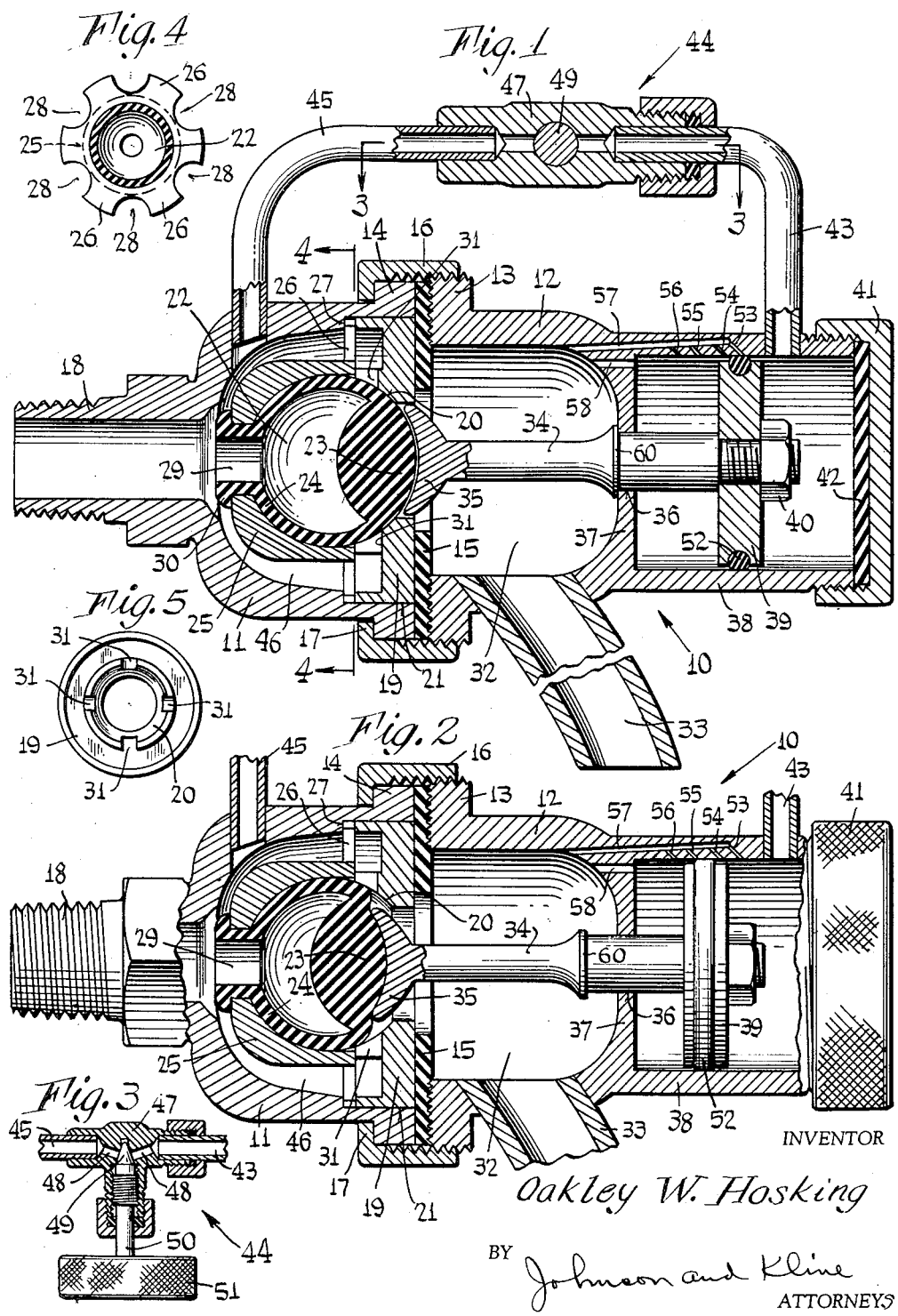

United States Patent Office 2,918,250
Patented Dec. 22, 1959

2,918,250

VALVE WITH FLUID-OPERATED CONTROL

Oakley W. Hosking, Monroe, N.Y., assignor to Hosking Patent Corporation, a corporation of New York Application July 17, 1953, Serial No. 368,675

1 Claim. (Cl. 251—35)

This invention relates to valves for controlling the flow of fluids under pressure.

The specific embodiments of the invention illustrated and described herein are adapted specifically for controlling the flow of liquids under pressure; however, it should be understood that the same concepts and principles may be employed in controlling the flow of fluids generally, and the invention is therefore not to be limited to the herein described specific illustrative examples.

Another species of the present invention is described and claimed in my copending application Serial No. 368,780, filed July 17, 1953, now Patent No. 2,789,577, granted April 23 1957.

In controlling the flow of liquids and other fluids, the commonly encountered simple valves, as for example the faucets of a sink or the like, consist of a valve seat and a cooperable valve body located in a suitable housing structure, the valve body being moved either against or away from the valve seat by a mechanical operator, actuated by hand or by other motive means. This common type of valve has found widespread acceptance and is in general satisfactory. It has, however, a number of drawbacks, as have similar valves intended for other applications but employing the same principle. For one thing, when this common type of faucet valve is shut off quickly, the resultant abrupt stoppage in the flow of liquid causes a phenomena known as water hammer, wherein a loud noise like a tap or blow is heard in the plumbing system. Also, with these common types of valves the manually operable stem which extends from the faucet housing requires packing to prevent leakage of water, and this often results in excessive friction on the stem, making it difficult to turn. If the packing nut is loosened to free the stem for easy movement, then there is the likelihood of water leakage, and in addition the nut can work loose, complicating the matter still further. Also, if for some reason it should be desired to operate the faucet or valve from a remote point this would require, except in the very simplest instances, the use of motorized or servo mechanisms which greatly increase the cost and complexity of the installation. These faucets or valves also are so constructed that the valve proper is mounted on and carried by the actuator, and accordingly this imposes structural or functional limitations on the valve. In some cases the valve cannot be immediately turned to "full-on" position, since some type of motion translating device such as a screw or cam is employed between the actuator and the valve member. Yet another drawback in these common valves or faucets is that the flow will vary for a given setting of the faucet handle or stem when the water pressure varies, or when there is a temperature change because hot water or other hot liquids are being handled.

In accordance with the present invention the above disadvantages and drawbacks of these prior valves are obviated and one object of the invention is to provide an improved fluid controlling valve by which a simplified and effective remote control may be had.

Another object of the invention is to provide an improved fluid-controlling valve in which no packing or packing nut is required for the actuator member of the valve proper, thereby enabling the valve to be readily operated without leakage of the fluid.

Yet another object of the invention is to provide an improved and simplified fluid-controlling valve capable of a relatively large movement of the valve proper and wherein such movement may be readily effected, by any suitable quick or slow-acting means to provide for full or gradual flow or stoppage of the fluid, and to provide an improved flexible valve proper one portion of which can be anchored and held stationary while another portion is movable through a relatively large distance to and away from the valve seat without unsymmetrical or distorted flexure which could adversely affect its operation.

A further object of the invention is to provide an improved fluid-controlling valve which eliminates the phenomena of water hammer when the valve is used in a water line.

A still further object of the invention is to provide an improved fluid valve in accordance with the above, wherein the flow of fluid will be maintained steady or constant for a given setting of the valve.

Yet another object of the invention is to provide an improved fluid controlling valve which is operable as an automatic check valve in response to a fluctuation of the fluid pressure in the fluid line which is being controlled.

I accomplish the above objects by the provision of a novel fluid-controlling valve mechanism the principles of which are set forth in the several specific embodiments of the invention herein illustrated. In these specific embodiments the valve proper is a flexible, collapsible ball having opposite walls one of which is anchored and held stationary while the other is movable against and away from the valve seat, the other when positioned fully away from the valve seat being nested within the anchored wall. The actuator for the valve proper is operated by fluid under pressure, which is preferably obtained from the fluid line which is being controlled, and in this connection a further object of the invention is to provide an improved fluid-controlling and fluid-operated valve having the above-enumerated advantages.

A feature of the invention is the provision of an improved valve as above set forth, which is simple in its construction and economical to fabricate, and extremely reliable in operation.

Other features and advantages will hereinafter appear.

In the accompanying drawings:

Figure 1 is an axial sectional view, enlarged, of an improved fluid controlling valve made in accordance with the invention, the valve proper or member being shown in closed position.

Fig. 2 is a view like Fig. 1 but with the valve proper shown partially open.

Fig. 3 is a horizontal sectional view, reduced, taken on line 3—3 of Fig. 1.

Fig. 4 is a fragmentary vertical transverse sectional view taken on line 4—4 of Fig. 1.

Fig. 5 is a face view of the valve seat component of the device.

Fig. 6 is a side elevational view of a valve made in accordance with the invention, adapted for remote control.

Fig. 7 is a diagrammatic view of a fluid distribution system equipped with halves made in accordance with the invention.

Fig. 8 is an enlarged axial sectional view illustrating another embodiment of the invention.

Fig. 9 is a fragmentary axial sectional view, reduced, of the valve of Fig. 8, with the valve proper shown in fully collapsed position.

Referring to Figs. 1 and 2, my improved fluid valve comprises a housing 10 formed essentially of two separable parts 11 and 12, the housing part 12 having a threaded flange 13 cooperable with a flange 14 on the housing part 11 for fastening purposes. Between the flanges 13 and 14 a sealing washer is preferably disposed, formed of rubber or other suitable material, and a nut 16 is threaded on the flange 13 and has a shoulder 17 engaging the flange 14 whereby the housing parts 11 and 12 may be securely attached to each other.

The housing part 11 has a tubular threaded fitting or nipple portion 18 by which it may be secured to a fluid line the flow of fluid from which is to be controlled.

Within the housing part 11 an annular valve seat member 19 is disposed, having an annular valve seat 20 and an outer peripheral portion 21 closely slidably fitting within the bore of the housing part 11. The valve seat member 19 abuts the sealing washer 15 and is positioned thereby in the housing 10.

In accordance with the present invention I provide a novel valve proper for cooperation with the valve seat 20 whereby an advantageous control of the flow of fluid through the fitting portion 18 of the housing 10 may be had. The valve proper comprises a collapsible ball 22 having a valve-seat engaging portion or wall 23 and an opposite wall 24, the latter wall being anchored to a cup-like supporting member 25 provided with an outwardly-extended flange or lip 26 which is located between the peripheral portion 21 of the valve seat member 19 and an internal shoulder 27 in the housing part 11. Movement of the seat-engaging wall 23 of the ball 22 away from the valve seat 20, as shown in Fig. 2, enables fluid to flow past the ball valve and through the valve seat, as will be hereinafter more fully described.

The lip 26 of the supporting member 25, Fig. 4, is provided with a plurality of notches 28 to permit the passage of fluid past the member 25 and the ball valve 22, and through the valve seat 20. As shown, the supporting member 25 is spaced from the inner walls of the housing part 11, and has an apertured bottom to receive a tubular boss 29 of the ball valve 22, the boss having an outwardly extending lip or flange 30 by which it is retained in the supporting member 25 and securely held thereby.

The valve seat member 19 is provided with a plurality of notches 31 located in the valve seat 20, one of said notches 31 being deeper than the other notches. The purpose of the notches 31, Fig. 2, is to enable a small flow or trickle of fluid through the valve when the ball 22 is first partially collapsed, as shown in Fig. 2. It will be noticed from Fig. 2 that the lower notch 31 is deeper than the other notches and presents a larger path than, for example, the upper notch 31, and by this variation in the depth in the notches there is avoided chattering of the valve during its operation in permitting a small flow of fluid.

The housing part 12 has a chamber 32 into which the fluid flows from the valve seat 20, and a nozzle 33 is provided on the housing part 12, to conduct the fluid from the valve chamber 32.

In accordance with the present invention a novel and improved means is provided for actuating the valve 22, utilizing fluid pressure which exists in the fluid line to which the nipple 18 is attached. This means comprises a plunger 34 having a cup-shaped end 35 disposed within the valve seat 20 and engaging the displaceable wall 23 of the ball valve 22. The plunger 34 passes through a central opening 36 in a transverse wall 37 in the housing part 12, and extends into a cylinder 38, being connected to a piston 39 by means of a nut 40 threaded to the shank as shown. The piston 39 is closed by a threaded cap 41 and a sealing liner 42, and is connected by a tube 43 with a needle valve 44 which is in turn connected by a tube 45 to the housing part 11. The tube 45 communicates with a chamber 46 of the housing part 11 in which the valve supporting cup 25 is disposed. Referring to Fig. 3 the needle valve 44 may be of conventional construction, having a housing 47 provided with a passage 48 which can be blocked by the pointed end 49 of a valve shank 50 threaded in the housing 47 and carrying a manually-engageable wheel or knob 51.

The piston 39 carries an O-ring 52 as a packing, and the cylinder 38 has a plurality of ports 53, 54, 55 and 56 connected with a channel 57 which communicates with the chamber 32 of the housing part 12. A vent channel 58 also connects the chamber 32 with the interior of the cylinder 38, and enables the piston 39 to move to the left without being blocked by fluid to the left of the piston. The ports 53, 54, 55 and 56 are arranged in order longitudinally of the cylinder 38 so as to be consecutively exposed to the fluid brought into the cylinder 38 by the tube 43 as the piston 39 is moved to the left, Fig. 1, in the valve opening direction.

Operation of the present improved fluid valve is as follows: Referring to Fig. 1, the needle valve 44 will be presumed to be closed. The ball valve 22 in assuming its normal shape will hold the wall 23 thereof against the valve seat 22. Fluid under pressure in the nipple 18 will occupy the interior of the ball 22 and also the chamber 46 surrounding the valve supporting cup 25. Such fluid, however, will be prevented from passing through the valve seat 20 and out of the nozzle 23. When it is desired to permit the flow of fluid from the nozzle 23, the needle valve 44 is opened. If the needle valve is opened slightly, fluid will flow through the tubes 45 and 43 into the cylinder 38 and the fluid under pressure in the cylinder will force the piston 39 to the left, thereby shifting the seat-engaging wall 23 of the ball 22 away from the valve seat 20. This action occurs because the total pressure or force on the piston 39 is greater, due to its large area, than the opposing force on the cupped end 35 of the plunger 34, since the area of the valve wall 23 engaged by the cupped end is smaller than the piston area. The piston 39 will move to an extent sufficient to uncover the cylinder port 53, whereupon a bleeding of the fluid from the cylinder 38 will take place, said fluid discharging into the low-pressure chamber 32 of the housing 10 and flowing out of the nozzle 33 with the fluid which is now flowing past the ball valve 22 through the notches 31 and the valve seat 20 and into the chamber 32. A balance will be reached between the opposing forces on the plunger 34, as determined by the rate of bleeding from the port 53, and a very fine control is thereby had of the position of the seat-engaging wall 23 of the valve, to provide a fine control of the flow of fluid from the nozzle 33.

If the needle valve 44 is opened a greater extent, the piston 39 will be moved further to the left, uncovering consecutively the ports 54, 55 and 56. Either one, two, three or four of the said ports will be exposed and rendered effective to bleed the cylinder 38, depending on the setting of the needle valve 44, and also portions only of said ports may be exposed.

As the wall 23 of the valve 22 is moved further to the left by the plunger 34 the entire valve seat 20 will be uncovered, so that fluid flows not only through the notches 31 but also past all of the valve seat.

I have found that by this organization a very fine and flexible control of the fluid flow through the nozzle 33 can be effected. The ball valve 22 may be either quickly or slowly, partially or wholly collapsed, providing a very responsive valve mechanism by which great or small flow may be readily obtained. Operation of the needle valve 44 needs only a very small manual force, as distinguished from the force required by the usual type of valve or faucet employing packing around a large-diameter stem which actuates directly the valve proper.

The relatively small diameter shank 50 of the needle valve 44, while used in conjunction with the usual packing or gland, may be easily turned without great manual effort because of its reduced diameter. Whenever the needle valve 44 is closed, with equalization of pressure on the inside and outside of the ball 22 the latter will assume its extended position shown in Fig. 1, closing the valve. At all times a substantially steady flow is obtained despite fluctuations in pressure in the fluid line, because the control of the ball is dependent on equalization of opposing forces on the plunger. A drop in line pressure means less pressure inside the ball, less pressure on the right face of the piston 39, and less bleeding of the cylinder, and these factors are so interrelated as to shift the piston 39 to the left slightly, opening the valve and maintaining the flow steady.

Sudden shutting off of the valve causes no water hammer in the line, due to the restraint of the piston by the small bleeding ports.

No packing or packing nut whatsoever is required for the plunger 34, which directly actuates the ball valve 22, and the plunger may be made to collapse the ball 22 either quickly or slowly, as desired.

While I have shown a piston and cylinder for the purpose of collapsing the ball valve 22, it is within the province of the present invention to employ other mechanical actuator means, either quick acting or slow acting, using suitable screws, cams or the like.

The ball valve 22 is securely held against turning or shifting by its tubular boss 29 and the supporting member 25, and therefore collapsing of the ball occurs in a symmetrical pattern, as shown in Fig. 2, regardless of the extent of the collapse. In other words, wholly controlled collapsing of the ball 22 is provided by the construction shown in Figs. 1 through 5.

Where fluid under relatively high pressure, for example, one hundred pounds per square inch or more, is to be controlled by the valve, it is preferable to provide a shoulder 60 on the plunger 34, for engagement with the transverse wall 37 of the housing part 12. Movement of the plunger 34 to the right is therefore restricted, and the cup-shaped end of the plunger 35 is enabled to support the seat-engaging wall 23 of the valve 22 and prevent the valve from being forced through the valve seat 20 from left to right.

Another embodiment of the invention is shown in Figs. 8 and 9. Parts or components generally similar in shape or function to those described above in connection with Figs. 1 through 5 have been given like characters but with the letter *a* added. The essential differences between the structure of Figs. 8 and 9 and that of Figs. 1 through 5 are that the plunger is attached to the valve-seat engaging wall of the ball valve and that the fluid conducting tubes and the needle valve controlling the tubes are incorporated in the valve housing instead of being disposed exteriorly thereof. The functioning of the valve shown in Figs. 8 and 9 is similar to that already described above.

With regard to these structural differences, the seat engaging wall 23a of the ball 22a is made with a thick cross section and provided with an undercut recess 61 to accommodate a shouldered extension 62 on the cupped end of the plunger 34a whereby the seat engaging wall is attached to the plunger.

The housing part 11a has a channel 63 communicating with a channel 64 in the housing part 12a, and the flow of fluid through said channels is controlled by the needle valve 44a.

The valve of the present invention is admirably adapted for purposes of remote control, as shown in Fig. 6. In this figure the tube 43b is made to have substantial length and the tube 45b is connected to a fluid line 65 at a point ahead of and remote from the threaded fitting 18b of the valve. The needle valve 44b in Fig. 6 may thus be located a remote distance from the main valve controlling the flow of fluid from the line 65, and by this organization a greatly simplified remote control of the flow of fluid may be had. Any number of valves may thus be connected to the fluid line 65, and by the use of individual needle valves the control of fluid through a plurality of branch lines may be readily effected.

The improved valve of this invention but having the valve ball fastened to the plunger as shown in Figs. 8 and 9, may be used as an automatic check valve to maintain pressures of hydraulic systems. As illustrated in Fig. 7 a fluid line 66 may have branches 67, 68, 69 and 70 controlled by valves 71, 72, 73 and 74 from which fluid lines 75, 76, 77 and 78 emanate. Assuming the valves 71, 72, 73 and 74 to have their needle valves normally in open position, if no fluid is flowing through the lines, the ball valves will all be closed since this is the position they take with equalized pressures. If fluid should be drawn from any of the lines 75, 76, 77 and 78, the resultant drop in pressure in the line 66 would immediately result in all the other valves remaining closed, thereby to maintain the pressure in the other branches. This result is obtained because, referring to Fig. 8, the chamber 32a now has the high pressure, and holds the piston 39a in its rightmost position, maintaining the ball valve 22a closed since the piston at all times dominates the ball.

Variations and modifications may be made within the scope of the claim and portions of the improvements may be used without others.

I claim:

Means for controlling fluid flow comprising an annular, concave valve seat; a valve comprising a flexible, collapsible ball one wall of which is engaged with said valve seat; and means for actuating the valve to move the engaged wall of the ball away from the valve seat, said seat having an annular portion engaging a portion of the engaged wall of the ball with the portion of the seat and ball being complementary, the annular portion being formed to provide recesses of different depths in the upstream portion thereof engageable with the ball to provide different sized openings between the portions of the seat and ball when the portions are separated.

References Cited in the file of this patent

UNITED STATES PATENTS

| | | |
|---|---|---|
| 98,153 | Deck | Dec. 21, 1869 |
| 419,916 | Blount | Jan. 21, 1890 |
| 589,124 | Evertsen | Aug. 31, 1897 |
| 602,074 | Gumtow | Apr. 12, 1898 |
| 1,005,117 | Judell | Oct. 3, 1911 |
| 1,178,422 | Smolarek | Apr. 4, 1916 |
| 1,347,276 | Johnson | July 20, 1920 |
| 1,782,580 | Myers | Nov. 25, 1930 |
| 2,205,033 | Dreyer | June 18, 1940 |
| 2,212,998 | Crane | Aug. 27, 1940 |
| 2,789,577 | Hosking | Apr. 23, 1957 |

FOREIGN PATENTS

| | | |
|---|---|---|
| 528,889 | Germany | July 4, 1931 |